(12) United States Patent
Laaksonen et al.

(10) Patent No.: US 11,272,240 B2
(45) Date of Patent: Mar. 8, 2022

(54) RENDERING CONTENT

(71) Applicant: Nokia Technologies Oy, Espoo (FI)

(72) Inventors: Lasse Juhani Laaksonen, Tampere (FI); Tapani Pihlajakuja, Vantaa (FI); Miikka Tapani Vilermo, Siuro (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/985,571

(22) Filed: Aug. 5, 2020

(65) Prior Publication Data

US 2021/0058663 A1 Feb. 25, 2021

(30) Foreign Application Priority Data

Aug. 20, 2019 (EP) .................................. 19192528

(51) Int. Cl.
*H04N 21/431* (2011.01)
*H04N 21/41* (2011.01)
*H04N 21/485* (2011.01)

(52) U.S. Cl.
CPC ..... *H04N 21/431* (2013.01); *H04N 21/41265* (2020.08); *H04N 21/4852* (2013.01)

(58) Field of Classification Search
CPC .......... H04N 21/431; H04N 21/41265; H04N 21/4852; G06F 3/162; G06F 3/04817
See application file for complete search history.

(56) References Cited

U.S. PATENT DOCUMENTS

| | | | |
|---|---|---|---|
| 7,177,413 B2 | 2/2007 | O'Toole | |
| 2007/0085759 A1* | 4/2007 | Lee | G11B 27/34 345/1.1 |
| 2010/0182265 A1* | 7/2010 | Kim | G06F 1/1641 345/173 |
| 2010/0321275 A1* | 12/2010 | Hinckley | G06F 1/1654 345/1.3 |
| 2014/0157125 A1* | 6/2014 | Seo | G06F 3/04886 715/716 |
| 2018/0329672 A1 | 11/2018 | Sadak et al. | |

FOREIGN PATENT DOCUMENTS

| | | |
|---|---|---|
| EP | 2738640 A2 | 6/2014 |
| EP | 3328092 A1 | 5/2018 |

OTHER PUBLICATIONS

"IVAS Usage Scenarios (IVAS-9)", 3GPP TSG-SA4#103 meeting, S4-190541, Version: 0.0.1Agenda: 7.5, Editor, Apr. 8-12, 2019, pp. 1-9.
Extended European Search Report received for corresponding European Patent Application No. 19192528.8, dated Nov. 8, 2019, 7 pages.

\* cited by examiner

*Primary Examiner* — Yassin Alata
(74) *Attorney, Agent, or Firm* — Harrington & Smith

(57) ABSTRACT

A method, apparatus as computer program is described comprising: obtaining or receiving content for presentation, wherein the content includes spatial audio data; rendering said content in a first direction; rendering said content in a second direction different to said first direction; and controlling the rendering of said content in said first direction and said second direction dependent, at least in part, on an angle between said first and second directions.

15 Claims, 11 Drawing Sheets

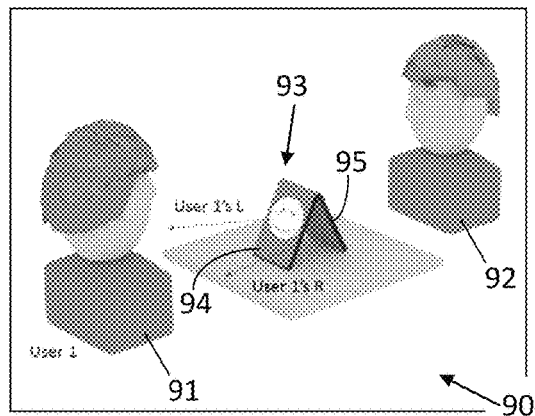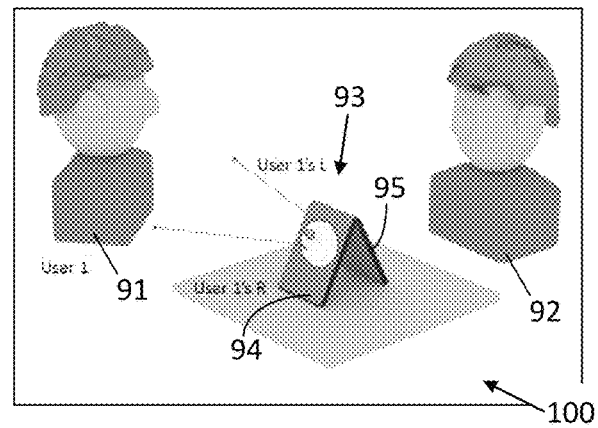
Fig. 9
Fig. 10
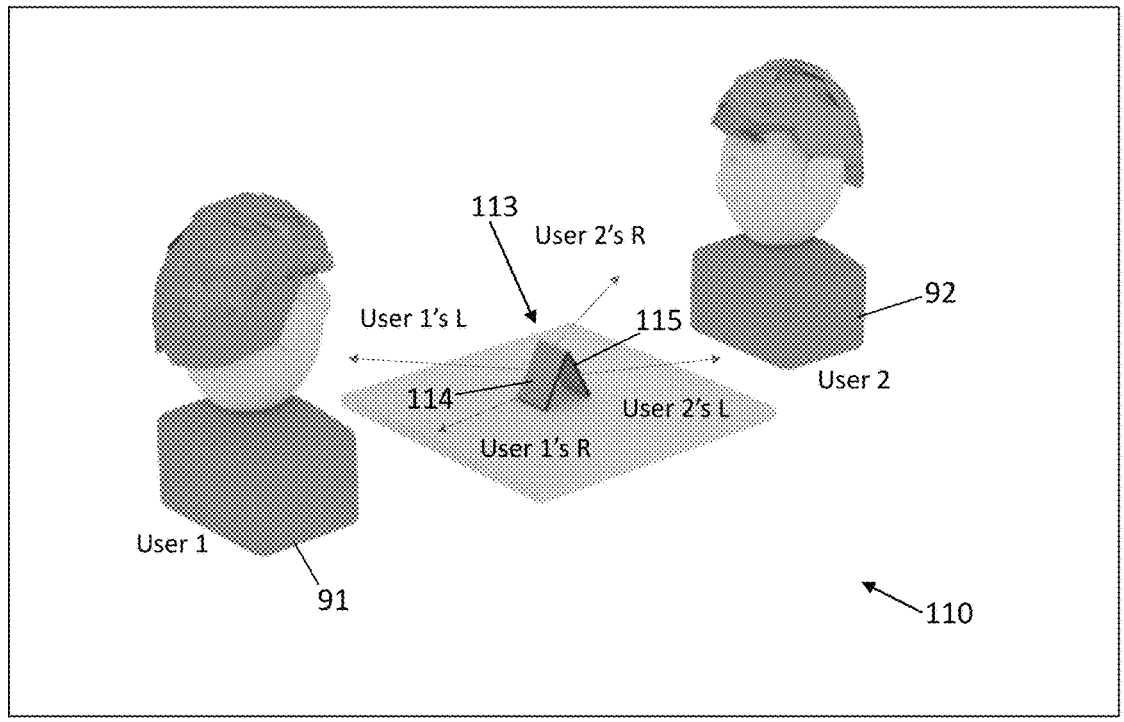
Fig. 11

RENDERING CONTENT

FIELD

The present specification relates to rendering content, for example to rendering content for presentation, including spatial audio data.

BACKGROUND

A number of developments have been made in the field of rendering content, such as spatial audio data. There remains a need for further developments in this field.

SUMMARY

In a first aspect, this specification provides an apparatus comprising: means for obtaining or receiving content for presentation, wherein the content includes spatial audio data; means for rendering said content in a first direction; means for rendering said content in a second direction different to said first direction; and means for controlling the rendering of said content in said first direction and said second direction dependent, at least in part, on an angle between said first and second directions.

In some examples, said content may include visual content.

In some examples, the means for rendering said content in the first direction and the means for rendering said content in the second direction form part of a single device.

Some examples include a first output means for providing said content in the first direction and a second output means providing said content in the second direction.

Some examples include means for selectively setting one of said first direction and said second direction as a primary direction and the other of said first direction and said second direction as a secondary direction.

In some examples, the means for controlling the rendering of said content in said first direction and said second direction is configured to output audio in mono in the event that neither of said first and second directions are set as the primary direction.

In some examples, the means for setting one of said first direction and said second direction as a primary direction sets said primary direction based, at least in part, on a position of a user being addressed by said content relative to one or more of said first direction and said second direction.

In some examples, the means for setting one of said first direction and said second direction as a primary direction sets said primary direction based, at least in part, on a position of a user addressing the apparatus relative to one or more of said first direction and said second direction.

In some examples, the means for controlling the rendering of said content in said first direction and said second direction is configured to modify the rendering of at least some spatial audio of the content in the secondary direction such the modified spatial audio in the secondary direction matches corresponding spatial audio of the content output in the primary direction.

In some examples, the means for controlling the rendering of said content in said first direction and said second direction is configured to modify the rendering of said at least some spatial audio of the content in the secondary direction, wherein the modifying comprises mirroring the respective spatial audio of the content output in the primary direction, in the event that the secondary direction is substantially opposite to the primary direction.

In some examples, the means for controlling the rendering of said content in said first direction and said second direction is configured to modify rendering of at least some of the visual content in the secondary direction to match said spatial audio of the content output in the primary direction.

In some examples, at least one of the first direction or the second direction are dependent on locations of one or more users of said content.

Some examples include means for determining whether the angle between said first direction and said second direction is above or below a threshold angle. In some examples, in the event that the angle is below said threshold angle, the means for controlling the rendering of said content in said first direction and said second direction is configured to cause rendering of a single output across the means for rendering the content in the first direction and the means for rendering the content in the second direction.

The means may comprise: at least one processor; and at least one memory including computer program code, the at least one memory and the computer program code configured, with the at least one processor, to cause the performance of the apparatus.

In a second aspect, this specification describes a method comprising: obtaining or receiving content for presentation, wherein the content includes spatial audio data; rendering said content in a first direction; rendering said content in a second direction different to said first direction; and controlling the rendering of said content in said first direction and said second direction dependent, at least in part, on an angle between said first and second directions. In some examples, said content may include visual content.

Some examples include selectively setting one of said first direction and said second direction as a primary direction and the other of said first direction and said second direction as a secondary direction.

In some examples, the rendering of said content in said first direction and said second direction may be controlled to output audio in mono in the event that neither of said first and second directions is set as the primary direction.

In some examples, setting one of said first direction and said second direction as a primary direction sets said primary direction based, at least in part, on a position of a user being addressed by said content relative to one or more of said first direction and said second direction. Alternatively, or in addition, in some examples setting one of said first direction and said second direction as a primary direction sets said primary direction based, at least in part, on a position of a user addressing the apparatus relative to one or more of said first direction and said second direction.

In some examples, controlling the rendering of said content in said first direction and said second direction modifies the rendering of at least some spatial audio of the content in the secondary direction such the modified spatial audio in the secondary direction matches corresponding spatial audio of the content output in the primary direction.

In some examples, controlling the rendering of said content in said first direction and said second direction modifies the rendering of said at least some spatial audio of the content in the secondary direction, wherein the modifying comprises mirroring the respective spatial audio of the content output in the primary direction, in the event that the secondary direction is substantially opposite to the primary direction.

In some examples, controlling the rendering of said content in said first direction and said second direction modifies rendering of at least some of the visual content in the secondary direction to match said spatial audio of the content output in the primary direction.

In some examples, at least one of the first direction or the second direction are dependent on locations of one or more users of said content.

Some examples determining whether the angle between said first direction and said second direction is above or below a threshold angle. In some examples, in the event that the angle is below said threshold angle, controlling the rendering of said content in said first direction and said second direction may cause rendering of a single output across the means for rendering the content in the first direction and the means for rendering the content in the second direction.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: obtaining or receiving content for presentation, wherein the content includes spatial audio data; rendering said content in a first direction; rendering said content in a second direction different to said first direction; and controlling the rendering of said content in said first direction and said second direction dependent, at least in part, on an angle between said first and second directions.

In a sixth aspect, this specification describes a computer-readable medium (such as a non-transitory computer-readable medium) comprising program instructions stored thereon for performing at least the following: obtaining or receiving content for presentation, wherein the content includes spatial audio data; rendering said content in a first direction; rendering said content in a second direction different to said first direction; and controlling the rendering of said content in said first direction and said second direction dependent, at least in part, on an angle between said first and second directions.

In a seventh aspect, this specification describes an apparatus comprising: at least one processor; and at least one memory including computer program code which, when executed by the at least one processor, causes the apparatus to: obtain or receive content for presentation, wherein the content includes spatial audio data; render said content in a first direction; render said content in a second direction different to said first direction; and control the rendering of said content in said first direction and said second direction dependent, at least in part, on an angle between said first and second directions.

In an eighth aspect, this specification describes an apparatus comprising: one or more input modules configured to obtain or receive content for presentation, wherein the content includes spatial audio data; one or more output modules configured to render said content in a first direction and to render said content in a second direction different to said first direction; and a control module configured to control the rendering of said content in said first direction and said second direction dependent, at least in part, on an angle between said first and second directions.

BRIEF DESCRIPTION OF THE DRAWINGS

Example embodiments will now be described, by way of non-limiting examples, with reference to the following schematic drawings, in which:

FIGS. 9 to 11 show systems for multi-directional rendering of content in accordance with example embodiments;

DETAILED DESCRIPTION

Figure 1:
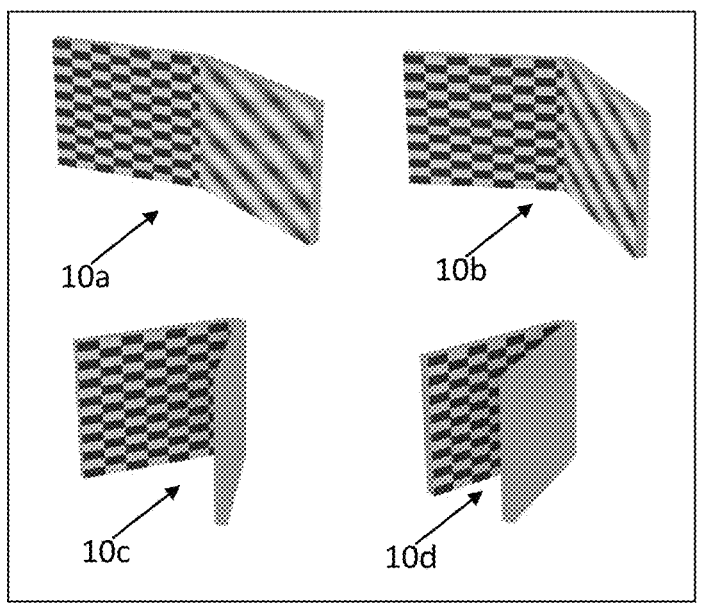
FIGS. 1 to 4 show views of devices in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Mobile communication devices, such as mobile phones, with foldable displays are known. Such devices often have a single display. By way of example, some devices include a single display that can be folded away into a so-called "clam"; for example, to make the device smaller to transport. Displays of such devices may be divided into two or more virtual displays. Moreover, it is possible to provide a device with two or more physical displays. For example, devices with more than one physical display may be effectively jointed together by sliding or folding to create what appears to be a single larger display. Such changes in display configuration may result in a change in user interface. For example, two display screens may first present two separate user interfaces, or one may duplicate the other. When a single display is created, the device may switch to a joint user interface mode where the screen real estate is effectively extended.

FIG. 1 shows views, indicated generally by the reference numeral 10, of a device in accordance with an example embodiment. The views 10 of the show a foldable device having two displays on the inside of a fold (although, as discussed further below, the foldable device may be implemented using a single physical display, which is foldable). A folding sequence is shown, starting from an almost flat (open) configuration 10a and successively more closed configurations 10b, 10c and 10d.

Figure 2:
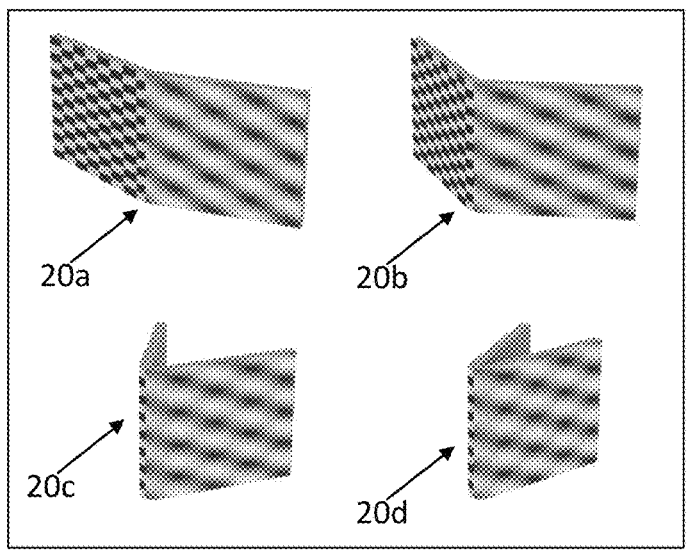

FIG. 2 shows views, indicated generally by the reference numeral 20, of a device in accordance with an example embodiment. The views 20 show a foldable device having two displays on the outside of a fold. A folding sequence is shown, starting from an almost flat (open) configuration 20a and successively more closed configurations 20b, 20c and 20d.

Figure 3:
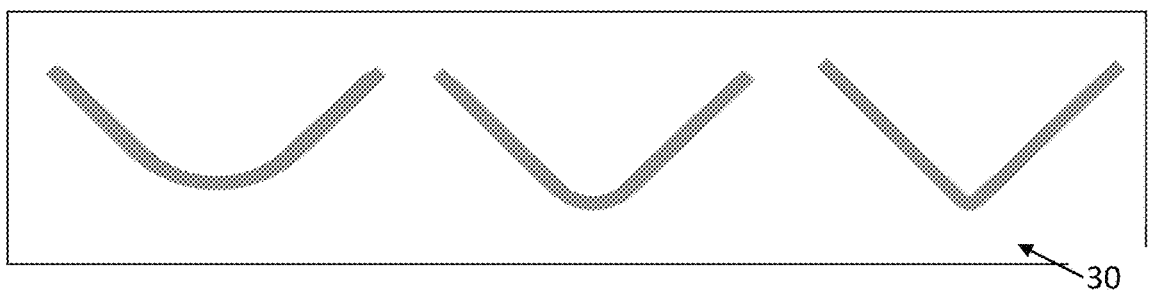

FIG. 3 shows views, indicated generally by the reference numeral 30, of devices in accordance with example embodiments in which the foldable corner of the devices have varying degrees of roundness. The views 30 include a device 30a with highly rounded corners, a device 30b with moderately rounded corners and a device 30c with almost square corners.

Figure 4:
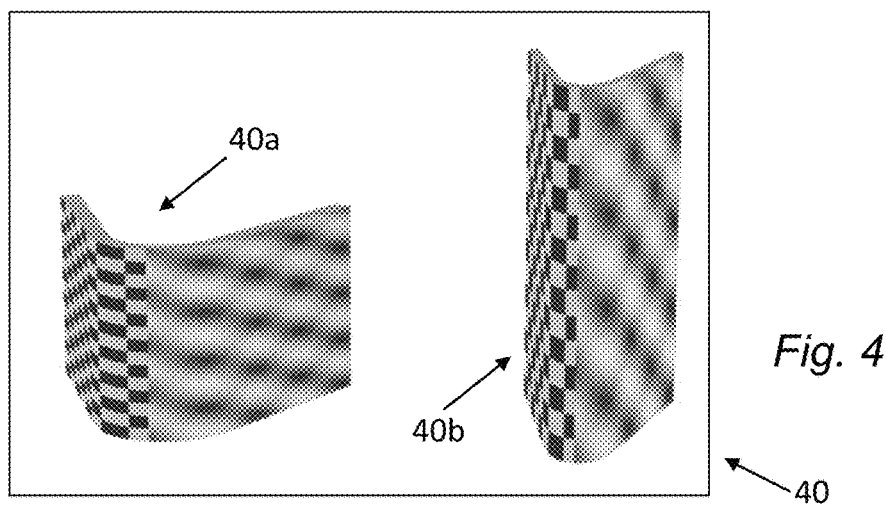

FIG. 4 shows views, indicated generally by the reference numeral 40, of a device in accordance with an example embodiment. The views 40 show that the junction of the displays does not need to be at the folding point. Thus, one of the displays may be on the "long" side of the device and the other on the shorter side or vice versa, as shown in the displays 40a and 40b respectively.

The views 10 to 40 are provided by way of example. The skilled person will be aware of many alternative configurations that could be provided.

Voice conferencing and video conferencing are common use cases related to telephony and mobile communication device. A number of embodiments related to voice and video conferencing are described below.

Figure 5:
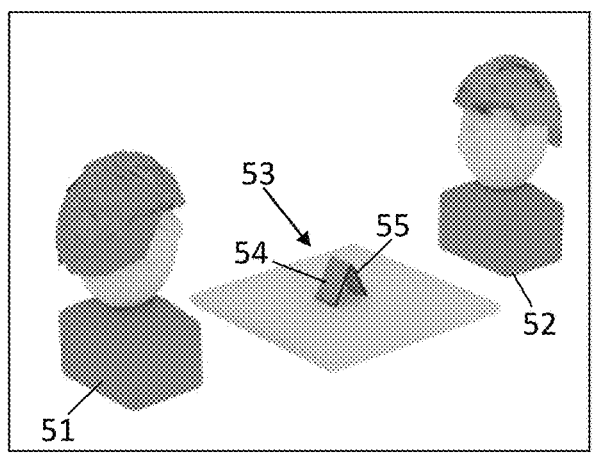
FIG. 5 shows a system for multi-directional rendering of content in accordance with an example embodiment.

FIG. 5 show a system, indicated generally by the reference numeral 50, for multi-directional rendering of content in accordance with an example embodiment. The system 50 comprises a first user 51, a second user 52 and a device (such as a mobile phone or a mobile communication device) indicated generally by the reference numeral 53. The device 53 has a first display 54 directed generally towards the first user 51 and a second display 55 directed generally towards the second user 52. The system 50 shows a "standing-A" configuration in which the device 53 is standing on two ends with the join between the two displays 54 and 55 pointing upwards. The first display 54 and/or the second display 55 may be used to provide a user interface to one or both of the first and second users 51 and 52. For example, audio and/or visual outputs may be provided.

Figure 6:
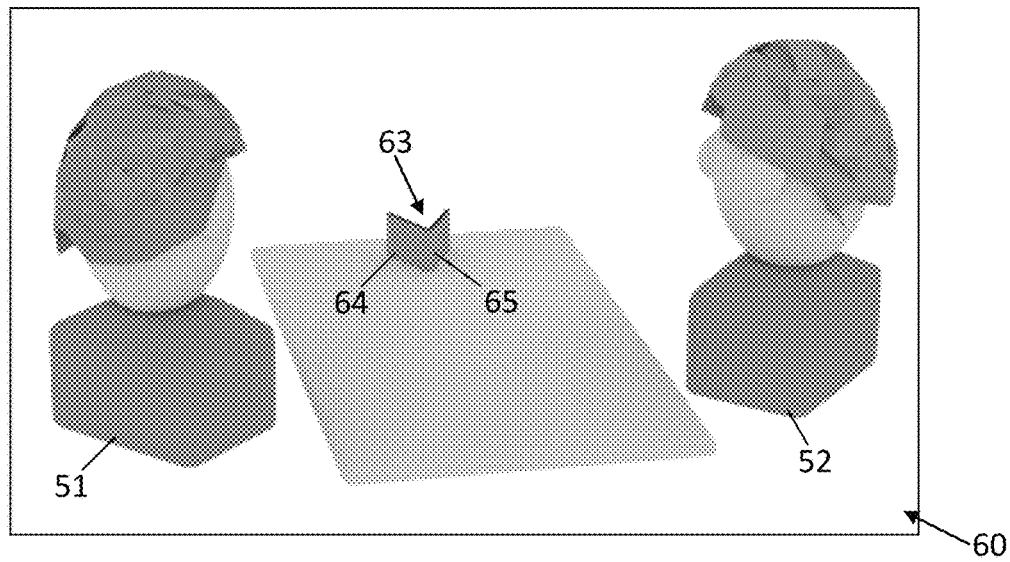
FIG. 6 shows a system for multi-directional rendering of content in accordance with an example embodiment.

FIG. 6 show a system, indicated generally by the reference numeral 60, for multi-directional rendering of content in accordance with an example embodiment. The system 60 comprises the first user 51 and the second user 52 described above. The system further comprises a device (such as a mobile phone or a mobile communication device) indicated generally by the reference numeral 63. The device 63 (which is similar to the device 53 described above) has a first display 64 directed generally towards the first user 51 and a second display 65 directed generally towards the second user 52. The system 60 shows a "fallen-A" configuration in which the device 63 is laying on its side with the join between the two displays 64 and 65 pointing forwards such that one end of each display is touching the surface on which the device in located. The first display 64 and/or the second display 65 may be used to provide a user interface to one or both of the first and second users 51 and 52. For example, audio and/or visual outputs may be provided.

Figure 7:
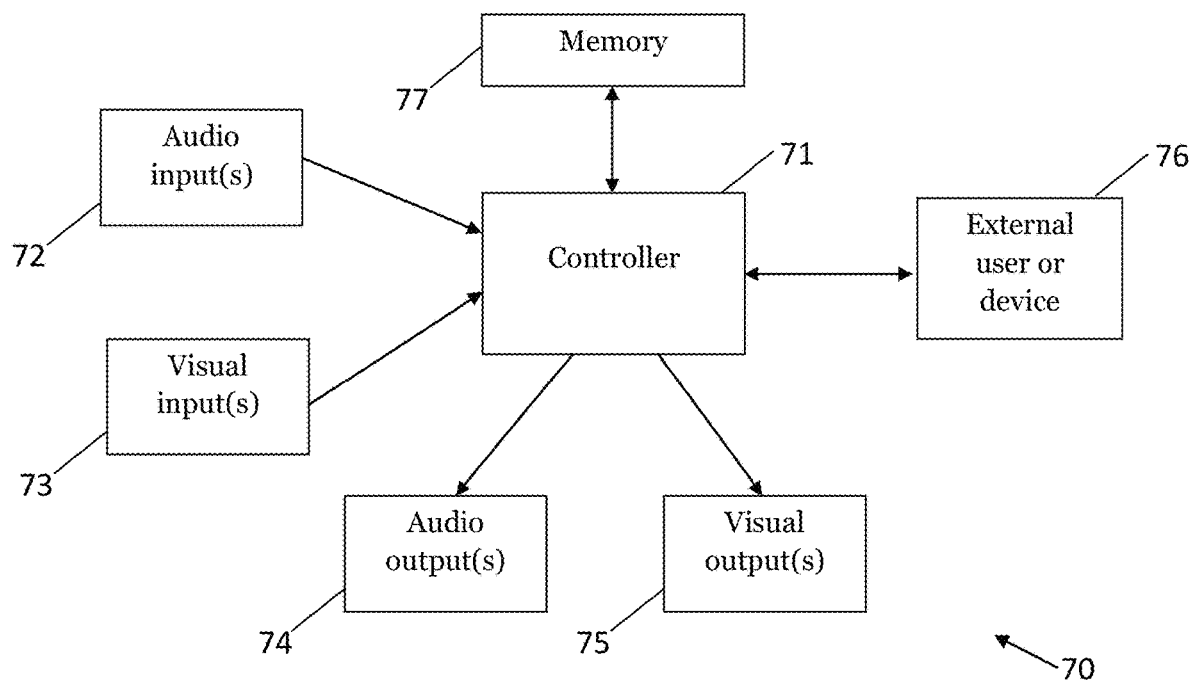
FIG. 7 shows an apparatus in accordance with an example embodiment.

FIG. 7 shows an apparatus, indicated generally by the reference numeral 70, in accordance with an example embodiment.

The apparatus 70 comprising a controller 71, one or more audio input devices 72 (such as microphones), one or more visual input devices 73 (such as video cameras), one or more audio output devices 74 (such as loudspeakers), one or more visual output devices 75, (such as video displays), an external user or device 76 (e.g. via a network, such as the Internet), and a memory 77. One of more of the elements of the apparatus 70 may be omitted in some example embodiments. Moreover, many variants to the apparatus 70 will be readily apparent to those of ordinary skill in the art.

Figure 8:
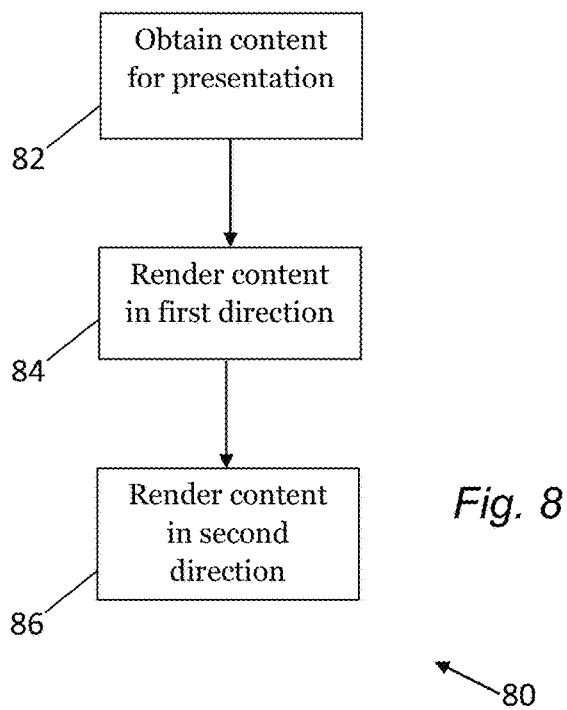
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 may, for example, be implemented using the apparatus 70.

The algorithm 80 starts at operation 82 where content for presentation is obtained or received. The content may include spatial audio data and may be audio-only content or may include visual and audio components (e.g. a videoconference). The said content may be received (e.g. as part of a videoconference) or obtained in some other way. For example, in the apparatus 70, the content may be received from the external device 76 or retrieved from the memory 77. The content may be received from a remote user (e.g. as part of a videoconference), but this is not essential to all embodiments.

At operation 84, the content is rendered in a first direction (e.g. using the first display 54 of the system 50 or the first display 64 of the system 60). At operation 86, content is rendered in a second direction (e.g. using the second display 55 of the system 50 or the second display 65 of the system 60). Clearly, the operation 84 and 86 may be performed in a different order or at the same time.

In the algorithm 80, the second direction is typically different to the first direction. The operation 84 and/or the operation 86 may include controlling the rendering of said content dependent, at least in part, on an angle between said first and second directions (e.g. the angle between relevant displays of a device, such as the devices 53 or 63). The controlling of the rendering may be implemented by the controller 71.

The content may be rendered in the first direction (in operation 84) by rendering the content on a first output means (such as the first display 54 of the device 53 or the first display 64 of the device 63). Similarly, the content may be rendered in the second direction (in operation 86) by rendering the content on a second output means (such as the second display 55 of the device 53 or the second display 65 of the device 63). The first and second output means may be separate (e.g. separate displays), but could be implemented as two parts of a single display (such as a foldable display).

The means for rendering the content in the first direction and the means for rendering said content in the second direction may form part of a single device (such as the device 53 or the device 63 described above). The device may, for example, be foldable such that said angle is changeable. As discussed further below, the operations 84 and 86 may be controlled such that the rendering of the content in the first and second direction is dependent, at least in part, on the angle between said first and second directions.

FIG. 9 show a system, indicated generally by the reference numeral 90, for multi-directional rendering of content in accordance with an example embodiment. The system 90 comprises a first user 91 and a second user 92 (similar to the first and second users 51 and 52 described above) and a device 93 (similar to the devices 53 and 63 described above). The device 93 has a first display 94 directed generally towards the first user 91 and a second display 95 directed generally towards the second user 92.

In the system 90, the first user 91 is a participant in an audio-visual teleconference (or perhaps a virtual reality (VR) teleconference) using the device 93. A face of a remote participant in the teleconference is visible on the first display 94. Also shown in the system 90 are example audio representations showing how spatial audio of the displayed content is matched to the left and right side of the first user 91.

FIG. 10 show a system, indicated generally by the reference numeral 100, for multi-directional rendering of content in accordance with an example embodiment. The system 100 comprises the first user 91, the second user 92 and the device 93 described above. In the system 100, the first user 91 has changed position and the device 93 has tracked the position of the user and changed the display of the content (on the first display 94) accordingly. Thus, the "first direction" referred to in the operation 84 described above has changed. Note that both the audio and the visual output in the first direction are changed relative to the outputs of the system 90.

The systems 90 and 100 illustrate a single participant (the first user 91) engaged in an audio-visual teleconference, with a second participant (the second user 92) optionally in attendance. A face of a remote participant in the videoconference can be presented to the first user (using the first display 94) with the correct spatial audio presentation, which may be dependent on the orientation of the first user 91 relative to the first display 94. In addition to modifying the audio presentation, the visual representation of the remote user may also be modified dependent on the orientation of the first user relative to the first display. For example, the visual representation of the remote user may be captured using 3D modelling or may be constructed using templates. Clearly, other visual representations of the remote user are possible.

As noted above, in the systems 90 and 100, the second user 92 is a non-participating user. This is not essential.

FIG. 11 show a system, indicated generally by the reference numeral 110, for multi-directional rendering of content in accordance with an example embodiment. The system 10 comprises the first user 91 and the second user 92 described above and additionally comprises a device 113 (similar to the device 93). The device 113 has a first display 114 directed generally towards the first user 91 and a second display 115 directed generally towards the second user 92.

In the system 110, the first user 91 and the second user 92 are both participants in an audio-visual teleconference, such as a virtual reality (VR) teleconference, using the device 113. A face of a remote participant in the teleconference is visible (to the first user 91) on the first display 114 and is also visible (to the second user 92) on the second display 115. Also shown in the system 110 are example audio representations showing how spatial audio of the displayed content is matched to the left and right side of the first user 91 and matched to the left and right side of the second user 92.

The audio presented to the first and second users 91 and 92 tend to contradict one another (with the left-side audio as presented to the first user 91 being output on the same side of the device 113 as the right-side audio as presented to the second user 92). This can lead to confusion.

Figure 12:
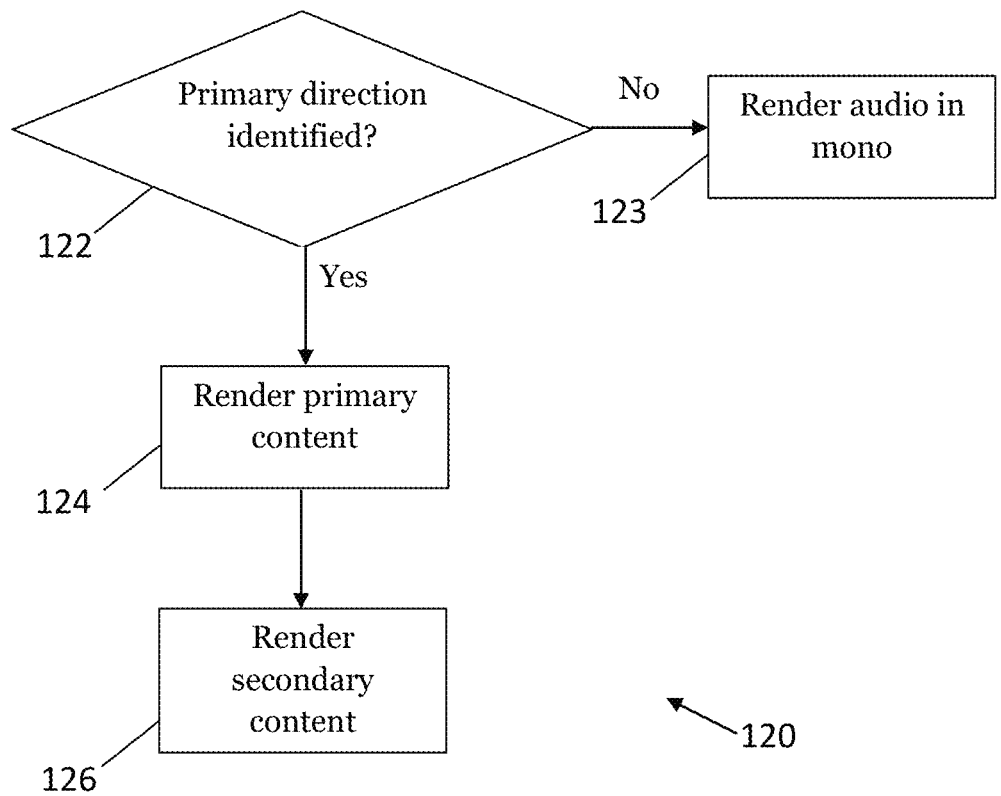
FIG. 12 is a flow chart showing an algorithm in accordance with an example embodiment.

FIG. 12 is a flow chart showing an algorithm, indicated generally by the reference numeral 120, in accordance with an example embodiment.

The algorithm 120 starts at operation 122, where it is determined whether or not a primary direction is identified. The operation 122 determines whether presentation to the first user 91 or the presentation to the second user 92 is considered to be the primary presentation (and hence to be the primary direction).

If a primary direction is identified in the operation 122, then primary content is rendered in the primary direction in operation 124 of the algorithm 120 and secondary content is rendered in the secondary direction in operation 126 of the algorithm 120. Clearly, the operation 124 and 126 may be performed in a different order or at the same time.

If no primary direction is identified in the operation 122, then the audio content is rendered in mono in operation 123 of the algorithm 120.

Figure 13:
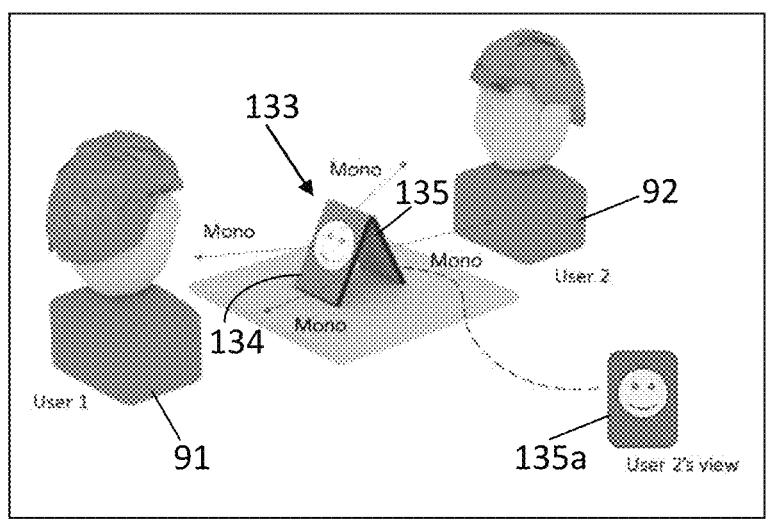
FIGS. 13 to 15 show systems for multi-directional rendering of content in accordance with example embodiments.

FIG. 13 shows a system, indicated generally by the reference numeral 130, for multi-directional rendering of content in accordance with an example embodiment.

The system 130 comprises the first user 91 and the second user 92 described above and additionally comprises a device 133 (similar to the devices 93 and 113). The device 133 has a first display 134 directed generally towards the first user 91 and a second display 135 directed generally towards the second user 92.

In the system 130, the first user 91 and the second user 92 are both participants in an audio-visual teleconference, such as a virtual reality (VR) teleconference, using the device 133. A face of a remote participant in the teleconference is visible (to the first user 91) on the first display 134 and is also visible (to the second user 92) on the second display 135 (as indicated by the view 135a). As shown in the system 130, the visual presentations to the first and second users are identical and the audio content is provided to each user as mono audio. Accordingly, the system 130 shows example outputs in accordance with the operation 123 of the algorithm 120 described above.

By rendering the audio output in mono to both users, confusion due to the different understanding of left and right due to the different positions of the first and second users 91 and 92 can be avoided (at the potential cost of reduction of immersion experienced by the users).

Thus, if neither of the first and second directions is set as the primary direction, the rendering of the content in said first and second direction may output audio in mono (and may additionally provide identical visual representations). However, in the event that one of the first and second directions is set as a primary direction, audio and/or visual outputs in the two directions may be handled differently.

Figure 14:
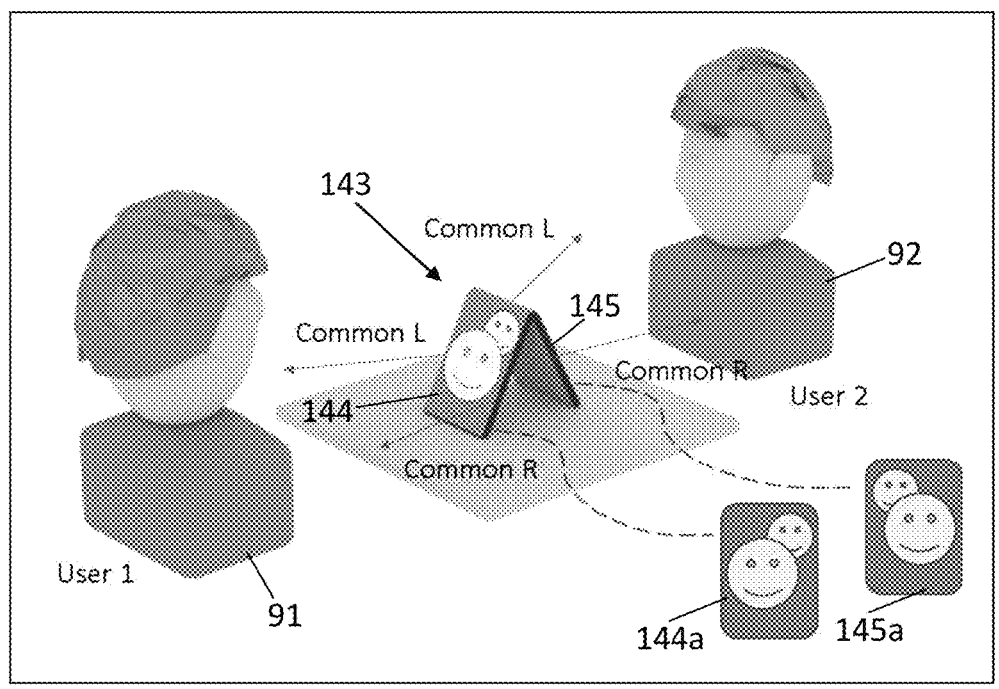

FIG. 14 shows a system, indicated generally by the reference numeral 140, for multi-directional rendering of content in accordance with an example embodiment.

The system 140 comprises the first user 91 and the second user 92 described above and additionally comprises a device 143 (similar to the devices 93, 113 and 133). The device 143 has a first display 144 directed generally towards the first user 91 and a second display 145 directed generally towards the second user 92.

In the system 140, the first user 91 and the second user 92 are both participants in an audio-visual teleconference, such as a virtual reality (VR) teleconference, using the device 143. A face of a remote participant in the teleconference is visible (to the first user 91) on the first display 144 (as indicated by the view 144a) and is also visible (to the second user 92) on the second display 145 (as indicated by the view 145a).

Assume that the first user 91 is defined as the primary user and content is rendered to the first user in the operation 124. The content is rendered to the second user 92 in the operation 126.

At least some of the spatial audio content rendered to the second user 92 in the operation 126 is modified to match corresponding spatial audio of the content output in the primary direction. Thus, as shown in FIG. 14, the left audio as rendered to the first user 91 is presented to the second user 92 on the right (as indicated by the "common L" arrow); similarly, the right audio as rendered to the first user 91 is presented to the second user 92 on the left (as indicated by the "common R" arrow). This results in common left and right audio being provided to the two users, thereby reducing the likelihood of confusion.

In the system 140 (where the second direction is user is substantially opposite to the primary direction), the rendering of the content in the first and second directions may be controlled such that at least some spatial audio of the content in the primary direction is mirrored before being presented in the secondary direction.

In addition to modifying (e.g. mirroring) of spatial audio data in the second direction, the corresponding visual data may be modified by a similarly modification (e.g. mirroring) process. For example, as shown in FIG. 14, the view 144*a* shows visual data presented in the primary direction, including a first remote participant and a second remote participant. The second remote participant is behind and to the right of the first remote participant. If spatial audio data is used, audio from the second remote participant will be rendered to the right of the first remote participant (thereby aiding an immersive experience).

The view 145*a* shows visual data presented in the secondary direction. Since the audio data has been modified such that audio to the right of the first rendering is presented on the left, a corresponding modification to the visual representation has been implemented, such that the second remote participant now appears behind and to the left of the first remote participant.

It should be noted that spatial mirroring may involve moving the location of faces within a displayed output (rather than mirroring of the faces themselves). In circumstances where mirroring has occurred, this may be indicated as part of the output as presented to the relevant viewer.

Figure 15:
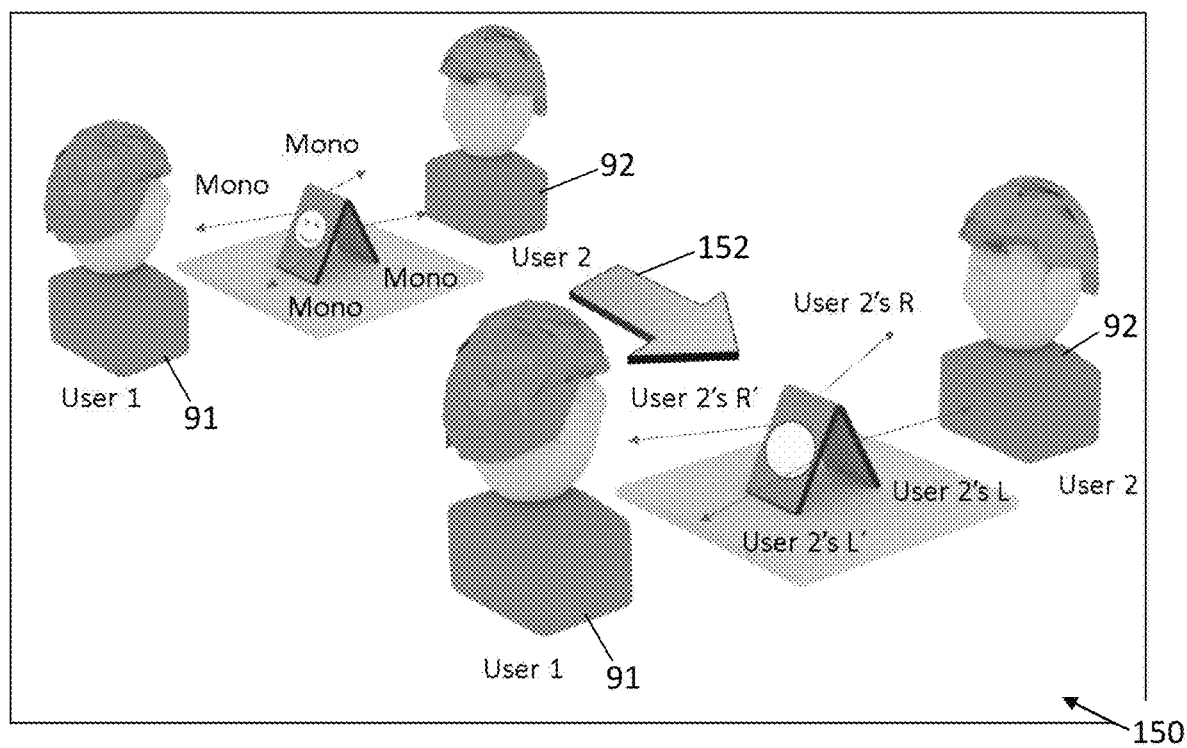

FIG. 15 shows a system, indicated generally by the reference numeral 150, for multi-directional rendering of content in accordance with an example embodiment.

The system 150 shows the transition from a scenario in which a mono audio output is provided (as in the system 130 described above) to a scenario in which the primary and secondary content are rendered differently (similar to the system 140 described above). The transition (indicated by the arrow 152) may be controlled in a number of ways, two of which are discussed further below.

Figure 16:
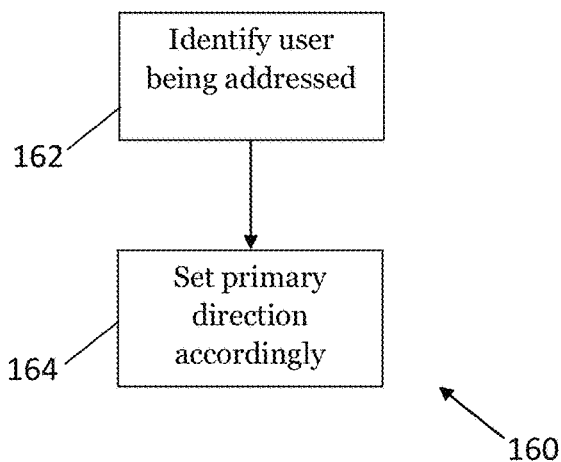
FIGS. 16 and 17 are flow charts showing an algorithm in accordance with an example embodiment.

FIG. 16 is a flow chart showing an algorithm, indicated generally by the reference numeral 160, in accordance with an example embodiment.

The algorithm 160 starts at operation 162, where a remote user is addressing one of the first and second users 91 and 92. The user being addressed is identified in operation 162 and the primary direction is set in operation 164 accordingly.

For example, the first and second users 91 and 92 may be taking part in a videoconference with one or more remote users. The videoconference output may be presented as separate displays to the first and second users, with identical visual representations and mono audio representations. In the event that a selected one of the first and second users is being addressed, a transition 152 occurs such that the display of the addressed user is the first display and the display of the other user is the second display. The audio and/or visual outputs provided to the second user may therefore be modified as discussed above.

A number of mechanisms may be provided to enable a remote user to specifically address one of the first and second users. A user interface input may be provided (e.g. a selection made from a list). Alternatively, a name of the addressed user may be mentioned. Alternatively, or in addition, a remote user may turn to a representation (e.g. an AR/VR avatar) of the user that they wish to address.

By way of example, a remote user may wish to say something to the first user 91 (for example), whilst remaining audible and visible to the second user 92 (and any other participant). In this case, the remote user may appear to turn away from the second user 92, with the audio directed to the second user being handled accordingly.

Figure 17:
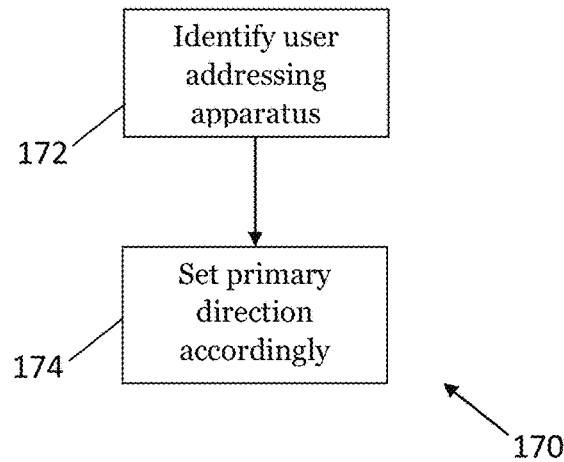

FIG. 17 is a flow chart showing an algorithm, indicated generally by the reference numeral 170, in accordance with an example embodiment.

The algorithm 170 starts at operation 172, where one of the first and second users 91 and 92 is identified as addressing the remote user. At operation 174, the primary direction is set accordingly. The operation 172 may be implemented in many different ways. For example, the operation 172 may simply identify whether either the first user 91 or the second user 92 is talking, with a talking user being set as the primary user.

Figure 18:
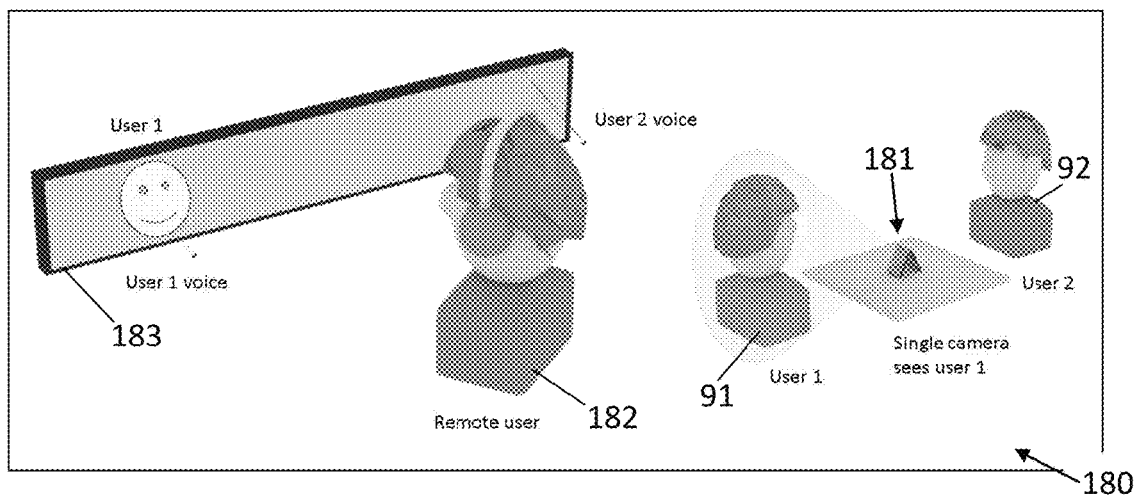
FIGS. 18 to 20 show systems for multi-directional rendering of content in accordance with example embodiments

FIG. 18 shows a system, indicated generally by the reference numeral 180, for multi-directional rendering of content in accordance with an example embodiment. The system 180 comprises a first user 91 and the second user 92 described above and device 181 (similar to the devices 93, 113, 133 and 143) having a first display directed generally towards the first user 91 and a second display directed generally towards the second user 92. The system 180 also includes a remote user 182 and a display 183 that is providing a visual output (and optionally an audio output) to the remote user 182.

In the system 180, the direction in which the remote user 182 is talking may be identified (e.g. using a camera). The remote user's (virtual) orientation relative to the first and second users may be presented appropriately using the displays of the device 181. Alternatively, or in addition, the display 183 may render spatial audio and spatial video of the first and second users such that the first and second user appear to the remote user 182 to be in different locations on the wide display 182.

Figure 19:
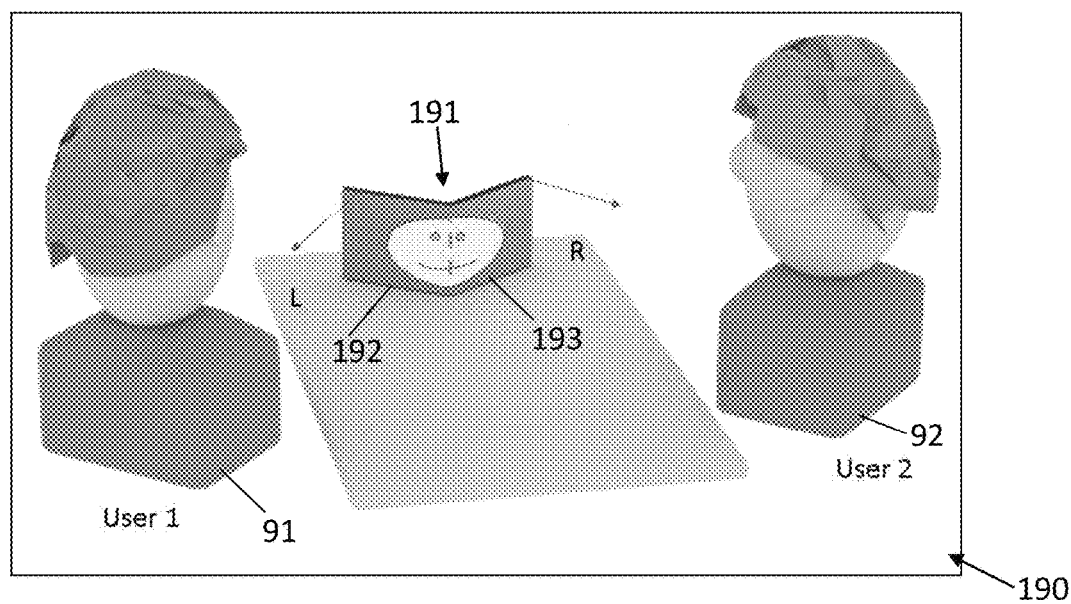

FIG. 19 shows a system, indicated generally by the reference numeral 190, for multi-directional rendering of content in accordance with an example embodiment. The system 190 comprises a first user 91 and the second user 92 described above and device 191 (similar to the devices 93, 113, 133, 143 and 181) having a first display directed generally towards the first user 91 and a second display directed generally towards the second user 92. In the system 190, the display 190 is used in a so-called "fake 3D" configuration.

The display 191 is used to display a face of a remote user, with the face being presented 25 on both of the first display 192 and the second display 193 such that the face is rendered with a slight 3D effect. This is achieved in the static viewing direction case because the display configuration forms a curve or angle that roughly resembles the 3D shape of the face. This has the advantage that a remote user face can be made visible on a relatively small display for users who are facing each other (e.g. sitting in two very different directions relative to the device 191). Furthermore, this configuration allows for a spatial audio presentation that is non-mono for the local users. The remote user therefore can appear as a "third person at the table".

Figure 20:
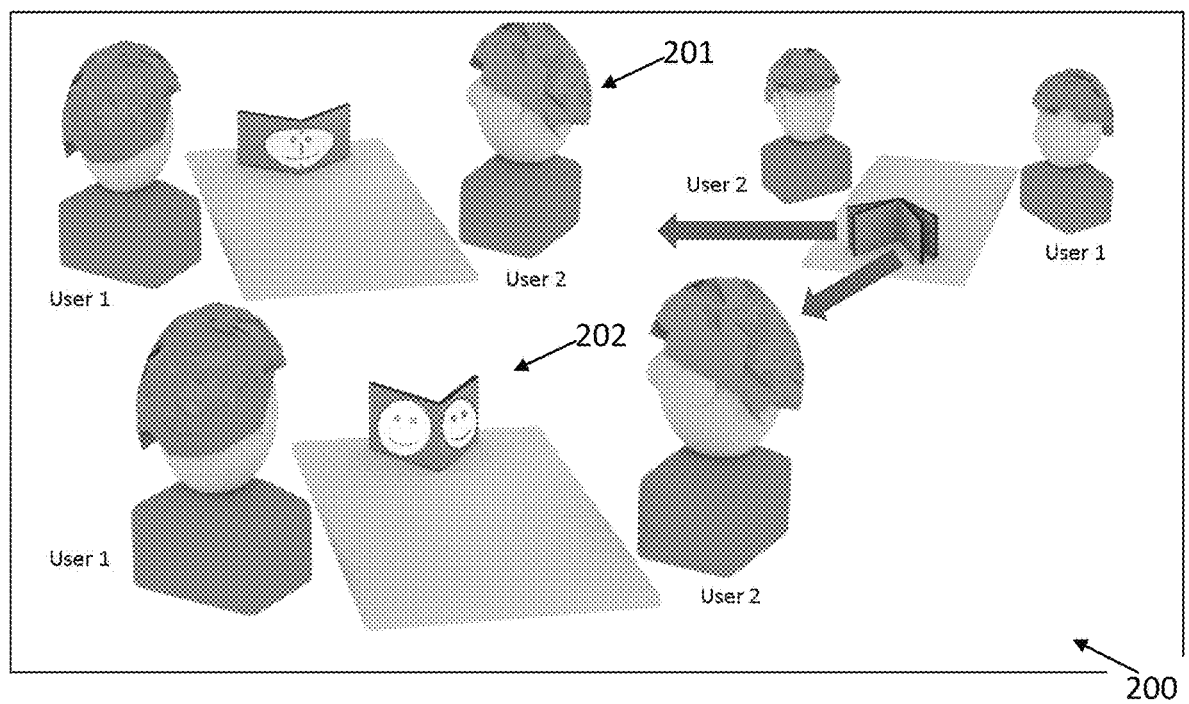

FIG. 20 shows a system, indicated generally by the reference numeral 200, for multi-directional rendering of content in accordance with an example embodiment.

The system 200 shows a first configuration, indicated generally by the reference numeral 201, in which a display is being used in the "fake 3D" configuration described above with respect to FIG. 19 and a second configuration, indicated generally by the reference numeral 202 in which the display is being used to provide separate outputs to the first and second user. The configuration may be dependent on the angle between the first and second displays of the display device.

Figure 21:
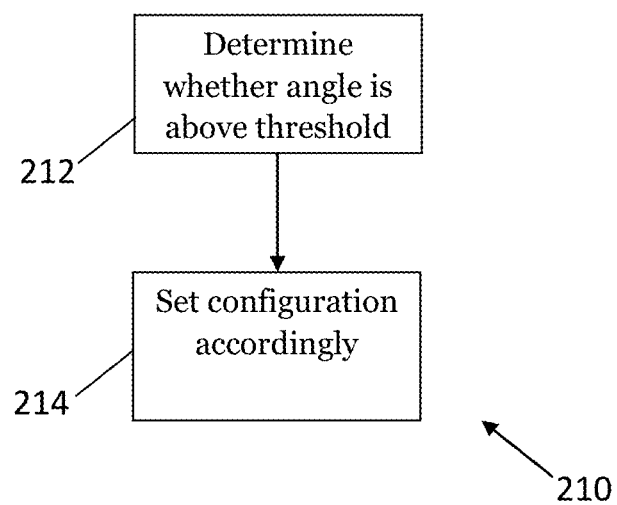
FIG. 21 is a flow chart showing an algorithm in accordance with an example embodiment.

FIG. 21 is a flow chart showing an algorithm, indicated generally by the reference numeral 210, in accordance with an example embodiment. At operation 212 of the algorithm 210, a determination is made regarding whether or not the angle between said first and second directions is above or below a threshold angle. At operation 214, a configuration is set accordingly. For example, a single output may be provided across the two displays of the device (e.g. the fake 3D effect described above) if the angle is below the threshold angle and separate outputs may be provided on the two displays if the angle is above the threshold angle.

Figure 22:
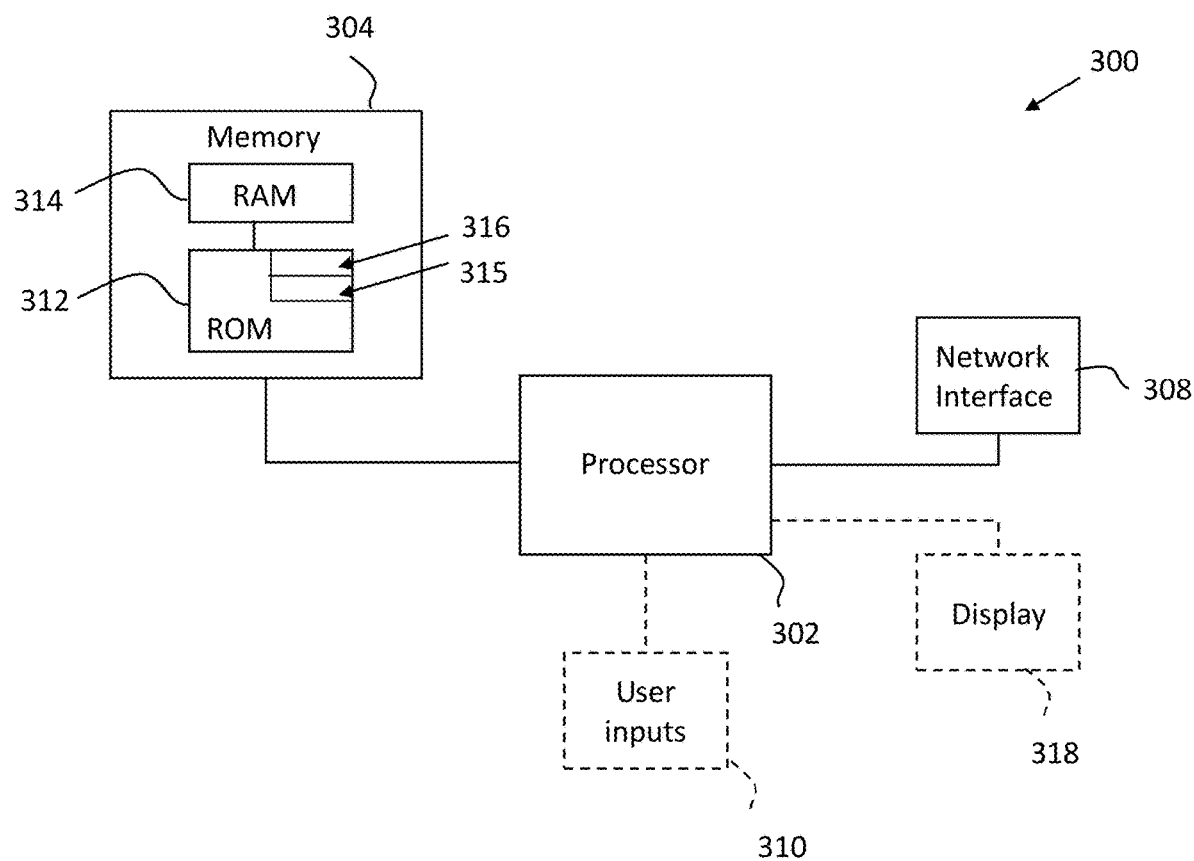
FIG. 22 is a block diagram of components of a system in accordance with an example embodiment.

For completeness, FIG. 22 is a schematic diagram of components of one or more of the modules for implementing the algorithms described above, which hereafter are referred to generically as processing systems 300. A processing system 300 may have a processor 302, a memory 304 coupled to the processor and comprised of a RAM 314 and ROM 312, and, optionally, viewer inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 80, 120, 160, 170, and 210.

The processor 302 may take any suitable form. For instance, it may be a microcontroller, plural microcontrollers, a processor, or plural processors. Processor 302 may comprise processor circuitry.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 23A:
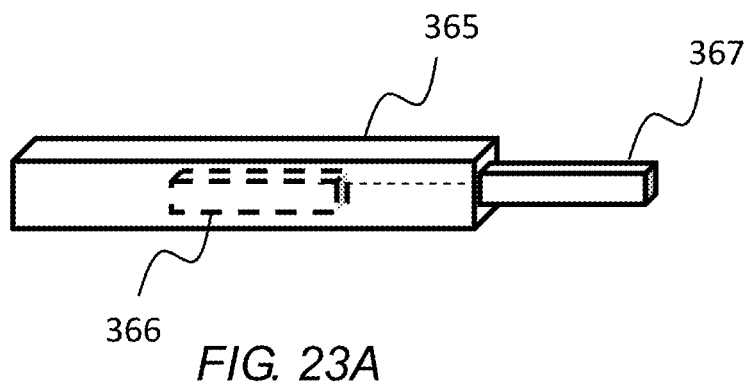
FIGS. 23A and 23B show tangible media, respectively a removable non-volatile memory unit and a Compact Disc (CD) storing computer-readable code which when run by a computer perform operations according to example embodiments.
Figure 23B:
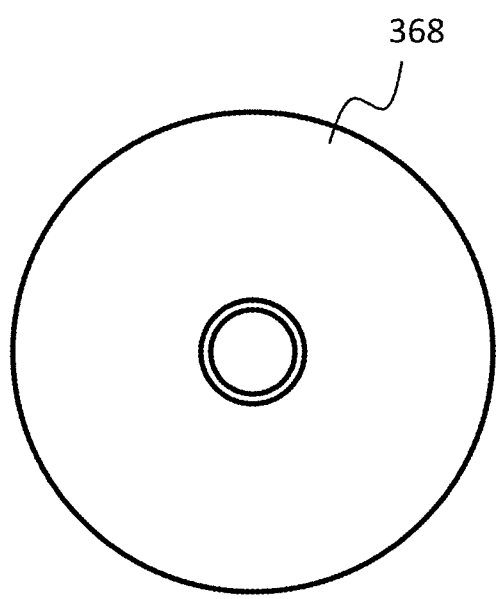

FIG. 23A and FIG. 23B show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 8, 12, 16, 17, and 21 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one non-transitory memory including computer program code;
   the at least one memory and the computer program code configured to, with the at least one processor, cause the apparatus at least to perform:
   obtain content for presentation, wherein the content includes spatial audio data;
   render said content in a first direction;
   render said content in a second direction different to said first direction;
   selectively set one of said first direction or said second direction as a primary direction;
   selectively set the other of said first direction or said second direction as a secondary direction; and
   control the rendering of said content in said first direction and said second direction dependent, at least in part, on an angle between said first and second directions, wherein control of the rendering of said content in said first direction and said second direction comprises modifying the rendering of at least some of the spatial audio data of the content rendered in the secondary direction so as to modify a perceived direction associated with the at least some of the spatial audio data to match a perceived direction of corresponding spatial audio data of the content rendered in the primary direction,
   wherein the modifying of the rendering of the at least some of the spatial audio data of the content rendered in the secondary direction is configured to modify a spatial location of the at least some of the spatial audio data to be a first location relative to the primary direction, wherein a spatial location of the corresponding spatial audio data rendered in the primary direction is the first location relative to the primary direction.

2. An apparatus as claimed in claim 1, further comprising one or more displays in a single device wherein rendering said content in the first direction and rendering said content in the second direction is done via the one or more displays.

3. An apparatus as claimed in claim 2, wherein said device is foldable such that said angle is changeable.

4. An apparatus as claimed in claim 1, wherein the at least one memory and the computer program code are further configured to, with the at least one processor, cause the apparatus to perform:
   render said content in the first direction via a first display and rendering said content in the second direction via a second display in a single device.

5. An apparatus as claimed in claim 1, wherein selectively setting one of said first direction or said second direction as the primary direction comprises setting said primary direction based, at least in part, on a position of a user being addressed with said content relative to one or more of said first direction or said second direction.

6. An apparatus as claimed in claim 1, wherein selectively setting one of said first direction or said second direction as the primary direction comprises setting said primary direction based, at least in part, on a position of a user addressing the apparatus relative to one or more of said first direction or said second direction.

7. An apparatus as claimed in claim 1, wherein controlling the rendering of said content in said first direction and said second direction comprises modifying the rendering of said at least some of the spatial audio data of the content rendered in the secondary direction so as to mirror the perceived direction of the corresponding spatial audio data of the content rendered in the primary direction, where the secondary direction is substantially opposite to the primary direction.

8. An apparatus as claimed in claim 1, wherein said content includes visual content.

9. An apparatus as claimed in claim 8, wherein controlling the rendering of said content in said first direction and said second direction comprises modifying rendering of at least some of the visual content in the secondary direction to match said corresponding spatial audio data of the content rendered in the primary direction.

10. An apparatus as claimed in claim 1, wherein at least one of the first direction or the second direction are dependent on locations of one or more users of said content.

11. An apparatus as claimed in claim 1, wherein the at least one memory and the computer program code are further configured to, with the at least one processor, cause the apparatus to perform:
    determine whether the angle between said first direction and said second direction is above or below a threshold angle, wherein controlling the rendering of said content in said first direction and said second direction comprises rendering of a single output in the first direction and in the second direction, in the event that the angle is below said threshold angle.

12. A method comprising:
    obtaining content for presentation, wherein the content includes spatial audio data;
    rendering said content in a first direction;
    rendering said content in a second direction different to said first direction;
    selectively setting one of said first direction or said second direction as a primary direction;
    selectively setting the other of said first direction or said second direction as a secondary direction; and
    controlling the rendering of said content in said first direction and said second direction dependent, at least in part, on an angle between said first and second directions, wherein the controlling of the rendering of said content in said first direction and said second direction comprises modifying the rendering of at least some of the spatial audio data of the content rendered in the secondary direction so as to modify a perceived direction associated with the at least some of the spatial audio data to match a perceived direction of corresponding spatial audio data of the content rendered in the primary direction,
    wherein the modifying of the rendering of the at least some of the spatial audio data of the content rendered in the secondary direction is configured to modify a spatial location of the at least some of the spatial audio data to be a first location relative to the primary direction, wherein a spatial location of the corresponding spatial audio data rendered in the primary direction is the first location relative to the primary direction.

13. A method of claim 12, wherein rendering said content in the first direction and rendering said content in the second direction is done via one or more displays of an apparatus.

14. A method of claim 12, comprising:
providing said content in the first direction and
providing said content in the second direction.

15. A non-transitory computer readable medium comprising program instructions stored thereon for performing at least the following:
obtain content for presentation, wherein the content includes spatial audio data;
render said content in a first direction;
render said content in a second direction different to said first direction;
selectively set one of said first direction or said second direction as a primary direction;
selectively set the other of said first direction or said second direction as a secondary direction; and
control the rendering of said content in said first direction and said second direction dependent, at least in part, on an angle between said first and second directions, wherein control of the rendering of said content in said first direction and said second direction comprises modifying the rendering of at least some of the spatial audio data of the content rendered in the secondary direction so as to modify a perceived direction associated with the at least some of the spatial audio data to match a perceived direction of corresponding spatial audio data of the content rendered in the primary direction,
wherein the modifying of the rendering of the at least some of the spatial audio data of the content rendered in the secondary direction is configured to modify a spatial location of the at least some of the spatial audio data to be a first location relative to the primary direction, wherein a spatial location of the corresponding spatial audio data rendered in the primary direction is the first location relative to the primary direction.

* * * * *